United States Patent [19]

Park

[11] Patent Number: 4,992,865
[45] Date of Patent: Feb. 12, 1991

[54] TELETEXT RECEIVING DEVICE FOR THE BLIND

[75] Inventor: Kwan Park, Seoul, Rep. of Korea

[73] Assignee: SamSung Electronics Co., Ltd., Suweon, Rep. of Korea

[21] Appl. No.: 391,992

[22] Filed: Aug. 10, 1989

[51] Int. Cl.⁵ .............................................. H04N 7/08
[52] U.S. Cl. ..................................... 358/94; 358/146; 434/113
[58] Field of Search ................... 358/94, 93, 147, 142; 434/113, 114

[56] References Cited

U.S. PATENT DOCUMENTS 4,836,784  6/1989  Burchart ............................ 434/113

OTHER PUBLICATIONS

"A Reading Eye for the Blind"; Brugler et al.; *Optical Spectra;* Feb. '71; pp. 18–22.
"The Data Dot System"; Summers; *Signal;* Jan. '75; pp. 35–42; vol. 29, #4.

*Primary Examiner*—Victor R. Kostak
*Attorney, Agent, or Firm*—Robert E. Bushnell

[57] ABSTRACT

A teletext receiving device for converting a teletext letter information into Braille for the blind users. The device includes a Braille head for converting a letter similar to the teletext letter on CRT into Braille, Braille code converter for converting the teletext letter code into Braille code; and Braille head driver for driving Braille head by an output signal of Braille code converter.

2 Claims, 4 Drawing Sheets

FIG. 3. A
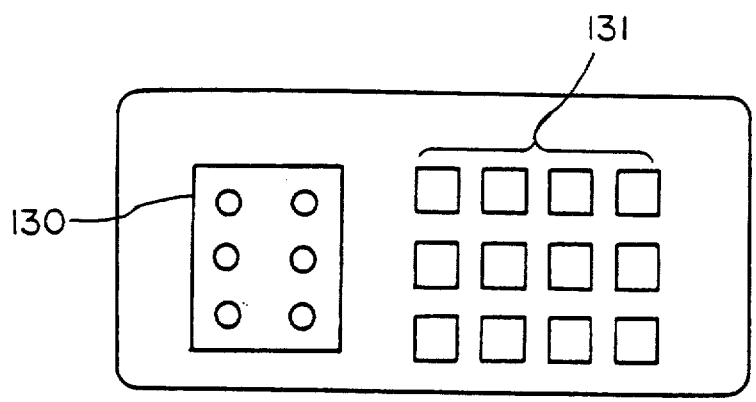
FIG. 3. B
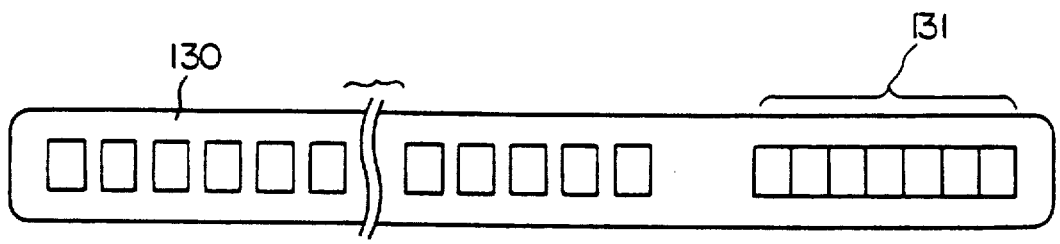
FIG. 3. C
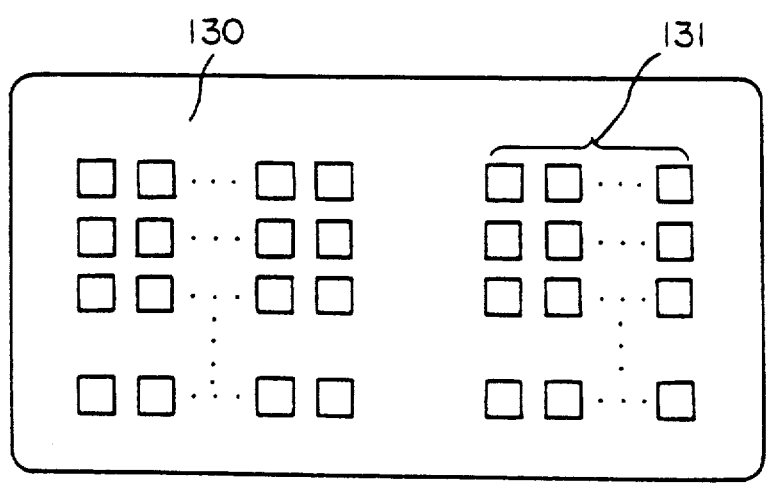

TELETEXT RECEIVING DEVICE FOR THE BLIND

FIELD OF THE INVENTION

The present invention relates generally to the teletext and, more particularly, to teletext receiving devices for the blind so that letter information is converted into Braille that the blind can recognize.

DESCRIPTION OF THE PRIOR ARTS

The teletext receiving device is that we can recognize displays a letter or image information on a screen such as cathode Ray Tube. CRT, or Liquid crystal Display; LCD, and then, as the blind aren't able to use the receiving device, they don't receive the benefits of civilitation.

As is well known in the art, the receiving circuit as shown in FIG. 1, has tuner (101) for selecting the channel of the teletext signal received from an antenna, the detector (102) for detecting an aural signal or an image signal from the output signal of the tuner (101), an image signal processor (103) and the aural signal processor (104) for processing an image signal and an aural signal detected from detector (102 ), the teletext data processing (105) for extracting a teletext data signal from said detector (102), the teletext control signal processor (106) for controlling the teletext data signal, the CRT controller (107) for receiving the output signal from control signal processor (106) and for storing in a video memory (111) with the digital teletext data signal, the TV-teletext switching (108) for selectively outputting a TV signal of said image signal processing (104) and a teletext signal of said CRT control (107) to CRT (110), and the speaker (109).

In conventional teletext receiving circuit, the blind have endured much problems of usage because the teletext information displays on the CRT screen.

SUMMARY OF THE INVENTION

Accordingly, it is an object of the present invention to provide the teletext receiving device for the blind which converts the teletext information into Braille code and consequently outputs Braille points so that the teletext information is readily available to the blind.

To accomplish the above object, the invention includes a Braille head associated with the CRT controller to display the same Braille points as the teletext letter, a Braille code converter for converting a letter code into Braille code under control of CRT controller (107), and the a Braille head driver for driving the Braille head in response to the output signal.

A preferred embodiment of the invention will now be described, by way of example only, with reference to the accompanying drawings, in which:

BRIEF DESCRIPTION OF THE DRAWINGS

FIGS. 3A-3C show the construction view of Braille head.

As shown in FIG. 2 in which the constitution of the invention operation is illustrated, the device of the present invention is as follows.

Figure 2:
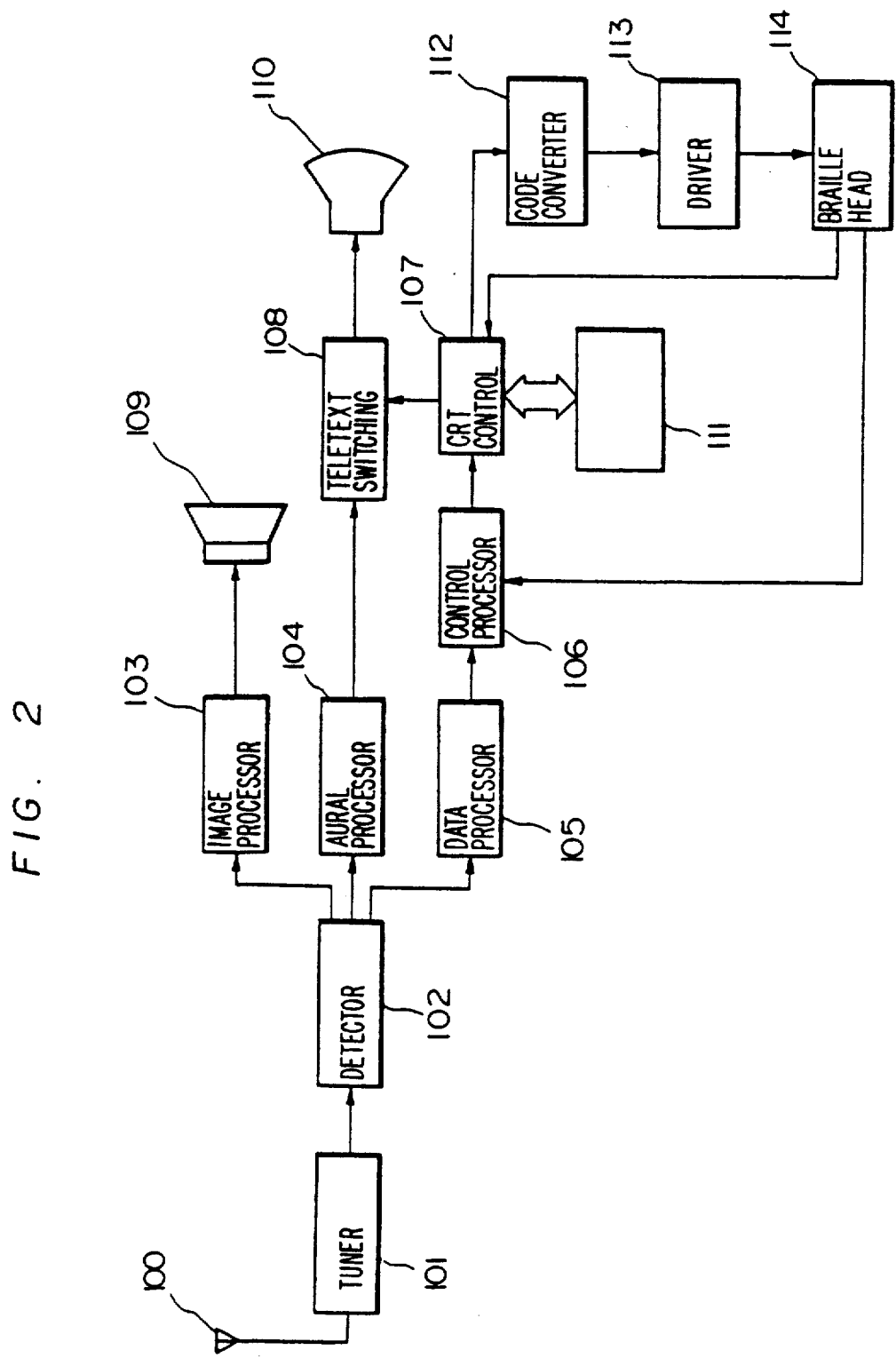
FIG. 2 is the construction view of the circuit according to the invention.

The constitution view of the present invention as shown in FIG. 2 comprises the teletext broadcasting signal inputted through an antenna 100 is channel-selected from the tuner 101. This channel-selected teletext signal is detected from the detector 102, the aural signal detected from said detector 102 is processed from the aural signal processor and is outputted in sound through the speaker 109.

Alternatively, the TV image signal detected from said detector 102 is input to the TV/teletext switching stage 108 by way of the image signal processor 109.

Meanwhile, the teletext data signal of a plural image signal from detector 102 is extracted to provide only the teletext data from the teletext data processor and is input to the teletext control signal processor 106. At the same time teletext control signal processor 106 controls the teletext data displays on CRT screen 110 by controlling CRT controller 107.

The CRT controller 107 instructs the teletext data received to be sent to the video memory 11 and to be stored therein and then the corresponding data received from video memory 111 again receives and is converted into an analog color signal (for example, Red, Green, Blue), thereafter it is sent to said TV/teletext switching 108.

TV/teletext switching 108 switches the TV broadcasting signal from said image signal processor 104 and the teletext data signal from said CRT controller 107, and then either the TV broadcasting or the teletext broadcasting is selected, and the CRT 110 is driven, at this time CRT 110 displays the signal in response to the TV broadcasting or the teletext broadcasting.

Accordingly, in case of the above operation, there are many problems which the optic angle obstacle can't know the contents of the teletext information. However, in case that the system according to the invention is available to the optic angle obstacle, they can know the contents of the letter shown on the CRT screen. A preferred embodiment will be described below.

As previously discussed, the teletext data processor 105 only extracts the teletext data included in TV signals and inputs them to said CRT controller 107 through said teletext control signal processor 106. The teletext signal inputted to CRT controller 107 is converted into the digital image signal and is stored in a video memory 111, at this time CRT controller 107 commands the digital image signal to display on CRT screen through said TV/teletext switching 108, at the same time input to Braille code converter 112.

As a letter code inputs to said Braille code converter (conv), Braille code converter (conv) converts such letter code into Braille code and Braille code inputs to Braille head driver 113. At this time as Braille head driver 113 drives Braille head corresponding to Braille code converting signal, the optic angle obstacle can recognize the same Braille points as the letter shown on CRT 110, touching Braille head with fingers.

FIG. 3 is the constitution view of Braille head, FIG. 3A illustrates Braille head corresponding to one letter, FIG. 3B illustrates Braille head corresponding to one line, FIG. 3C illustrates Braille head corresponding to one page. The reference No. 130 represents Braille head, the reference No. illustrates Braille head corresponding to one page. The 131 represents the key pad for function control.

Figure 4:
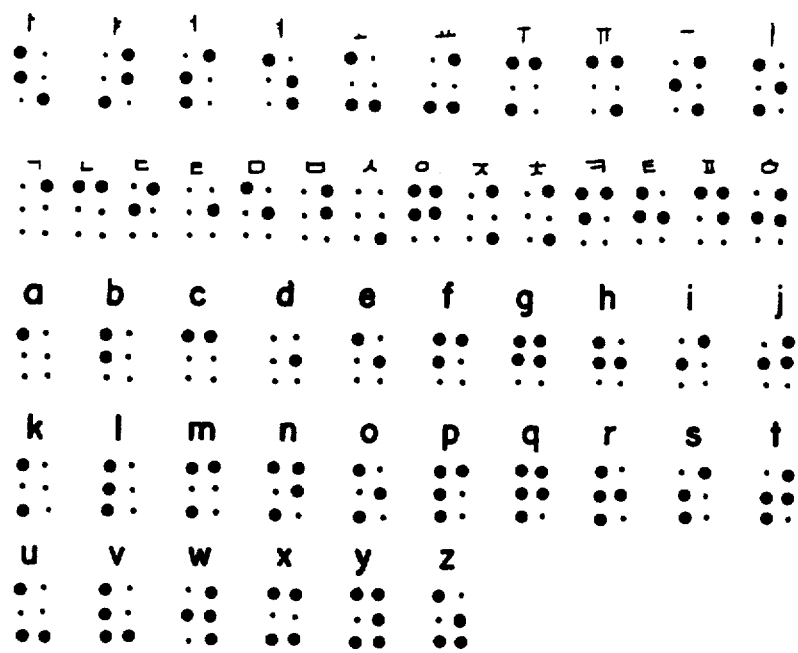
FIG. 4 illustrates Braille code for the blind.
Figure 5:
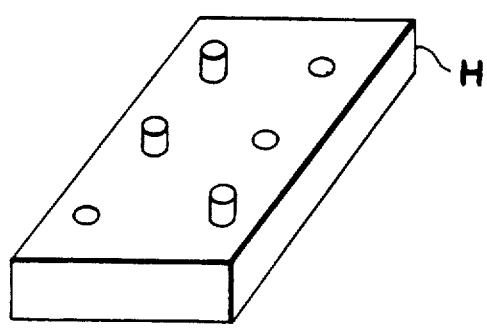
FIG. 5 illustrates Braille head indicating Braille code "⊢" in FIG. 4.

FIG. 4 illustrates Braille code consisting of 6 points for the optic angle obstacle, FIG. 5 represents "ㅏ" character of the vowels of the korean alphabet. That is, since the letter information changed into Braille code of "ㅏ" character actuates Braille head as the prominence and the depression by means of Braille head driver 113, the optic angle obstacle can be recognized with tactual sense.

The invention provides the effects that the blind can recognize letters similar to the letter shown on CRT by changing the letter code into Braille code and thereby driving a Braille head. Many modifications and variations of the present invention are possible and it is intended to cover all such as fall within the spirit and scope of the appended claims.

What is claimed is:

1. A teletext receiving device for the blind to display teletext data in a video memory on a visual display, comprising:
    first means providing a teletext code for converting a letter similar to a teletext letter displayed on the visual display into Braille symbols;
    second means providing an output signal for converting the teletext code into Braille code; and
    third means for driving the first means by means of the output signal of the second means.
2. The teletext receiving device of claim 1, wherein:
    said first means includes a Braille head for the blind,
    said second means includes a Braille code converter and
    said third means includes a Braille head driver.

* * * * *

UNITED STATES PATENT AND TRADEMARK OFFICE
CERTIFICATE OF CORRECTION

PATENT NO. : 4,992,865
DATED : February 12, 1995
INVENTOR(S) : Kwan Park

Figure 1:
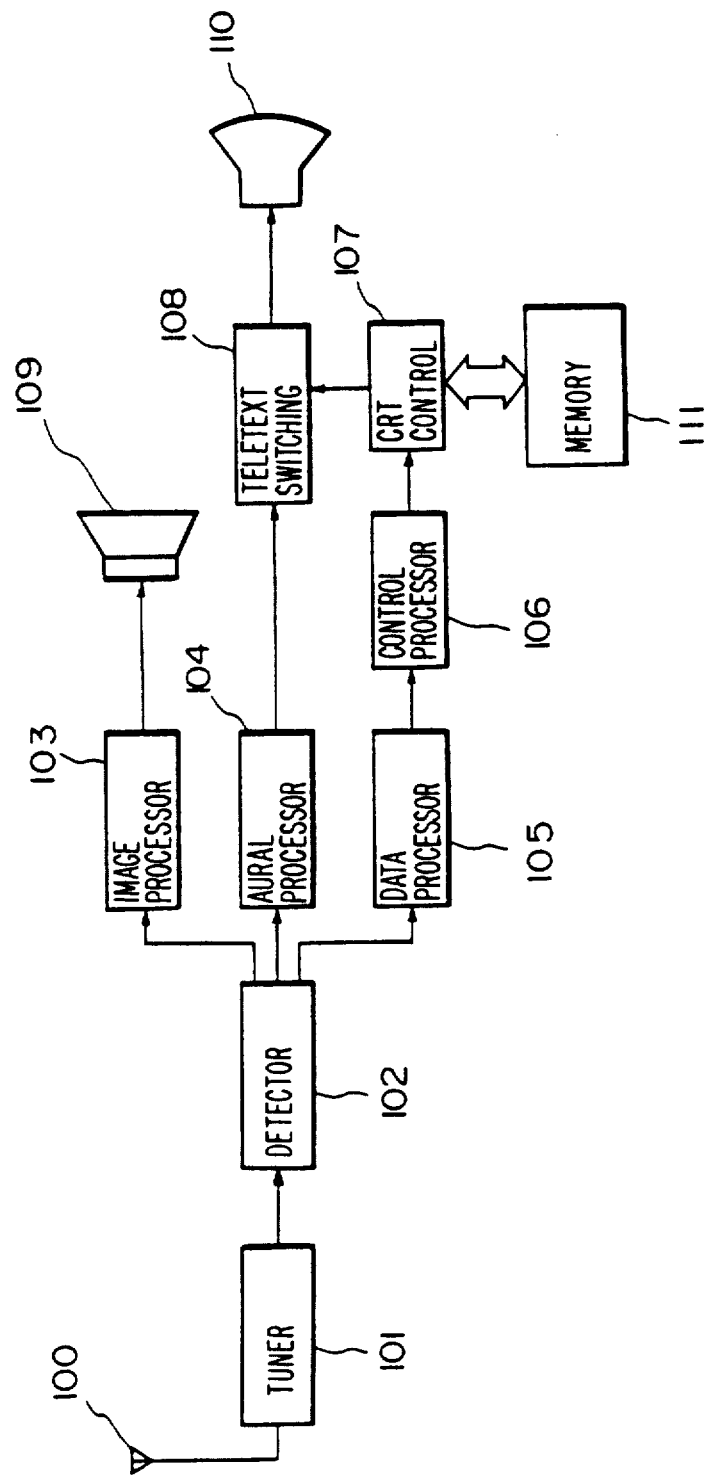
FIG. 1 is the construction view of the prior teletext receiving circuit.

It is certified that error appears in the above-indentified patent and that said Letters Patent is hereby corrected as shown below:

Column 1  Line 14,  After "Tube", change period " . " to comma -- , --;

Line 19,  After "Fig. 1", delete comma " , ";

Column 2  Line 14,  After "processor" change "109" to -- 104 --;

Line 23,  after "memory", change "11" to -- 111 --;

Line 66,  after "No.", delete "illustrates Braille head corresponding to one page. The"

Column 4, Line 13, after "converter", insert a comma --,--:

Signed and Sealed this

Twenty-sixth Day of September, 1995

Attest:

BRUCE LEHMAN

Attesting Officer    Commissioner of Patents and Trademarks